United States Patent [19]

Kira

[11] Patent Number: 5,630,150

[45] Date of Patent: May 13, 1997

[54] AUTOMATIC EDITING DEVICE FOR AN ENGLISH LETTER

[75] Inventor: Haruki Kira, Nagoya, Japan

[73] Assignee: Brother Kogyo Kabushiki Kaisha, Nagoya, Japan

[21] Appl. No.: 517,611

[22] Filed: Aug. 22, 1995

Related U.S. Application Data

[63] Continuation of Ser. No. 97,234, Jul. 27, 1993, abandoned.

[30] Foreign Application Priority Data

Aug. 5, 1992 [JP] Japan ............................... 4-231463

[51] Int. Cl.$^6$ ............................................. G06F 17/24
[52] U.S. Cl. ........................... 395/789; 395/785; 395/802
[58] Field of Search ............................... 395/144–149; 364/419.1, 419.17

[56] References Cited

U.S. PATENT DOCUMENTS

| | | | |
|---|---|---|---|
| 3,837,459 | 9/1974 | Martin | 364/419.1 |
| 4,202,041 | 5/1980 | Kaplow et al. | 345/168 |
| 4,358,824 | 11/1982 | Glickman et al. | 364/419.19 |
| 4,596,478 | 6/1986 | De George et al. | 400/76 |
| 4,687,353 | 8/1987 | De George et al. | 395/148 |
| 4,742,485 | 5/1988 | Carlson et al. | 395/148 |
| 4,862,386 | 8/1989 | Axelrod et al. | 395/148 |
| 4,898,483 | 2/1990 | Iizuka | 395/146 |
| 4,943,936 | 7/1990 | Hirai et al. | 395/148 |
| 4,949,287 | 8/1990 | Yamaguchi et al. | 395/148 |
| 4,965,763 | 10/1990 | Zamora | 364/419.19 |
| 4,970,665 | 11/1990 | Doi et al. | 395/148 |
| 5,280,574 | 1/1994 | Mizuta et al. | 395/146 |
| 5,287,445 | 2/1994 | Kataoka et al. | 395/148 |
| 5,323,313 | 6/1994 | Davis et al. | 364/419.17 |
| 5,353,222 | 10/1994 | Takise et al. | 395/148 |
| 5,363,480 | 11/1994 | Usami et al. | 395/145 |
| 5,517,621 | 5/1996 | Fukui et al. | 395/148 |

OTHER PUBLICATIONS

QuickLetter 2.0 Instructions, Working Software, Inc., pp. 16–17, 58–61. Jan. 1992.

Ringle et al., "Multi-page document display", IBM Technical Disclosure Bulletin, v. 23, No. 8, pp. 3794 and 3795 Jan. 1981.

Martinez, "Color It!", Mac/User, v. 8, No. 4, p. 83(3) Apr. 1992..

Merriam–Webster, Inc., *Webster's Guide to Business Correspondence*, 1988, pp. 8–11.

*Primary Examiner*—Heather R. Herndon
*Assistant Examiner*—Joseph R. Burwell
*Attorney, Agent, or Firm*—Oliff & Berridge

[57] ABSTRACT

In an automatic editing device for an English letter, text data of the English letter is input by operating character keys and a space key, and an automatic edit key is then operated. The input text data is displayed at a left end portion of a display, and the layouts of four typical letter formats identified as numerals 1–4 are also displayed at a central portion of the display. In this condition, when one of numeral 1–4 keys is operated, a letter format flag corresponding to the numeral is set to select a desired one of the four letter formats. Then, the input text data is automatically edited to the selected letter format. The edited text data is stored into a work memory, and the layout of the stored text data is displayed at a right end portion of the display. Thus, when an operator merely inputs the text data of the English letter, the automatic editing device operates to automatically edit the input text data to a desired letter format.

27 Claims, 24 Drawing Sheets

Fig.6B

| ITEM | INSTRUCTIONS |
|---|---|
| S55 | READ ONE LINE OF TEXT DATA |
| S56 | BLANK LINE ? |
| S57 | START ADDRESS OF THE NEXT LINE |
| S58 | ABT ← YP |
| S59 | SALUTATION DATA PRESENT ? |
| S60 | START ADDRESS OF THE NEXT LINE |
| S61 | READ ONE LINE OF TEXT DATA |
| S62 | ABB ← (YP-1) |
| S63 | GBT ← YP |
| S64 | START ADDRESS OF THE NEXT LINE |
| S65 | GBB ← (YP-1) |
| S66 | READ ONE LINE OF TEXT DATA |
| S67 | BLANK LINE ? |
| S68 | START ADDRESS OF THE NEXT LINE |
| S69 | PBT ← YP |
| S70 | START ADDRESS OF THE NEXT LINE |
| S71 | READ ONE LINE OF TEXT DATA |
| S72 | CLOSE DATA PRESENT ? |
| S73 | PBB ← (YP-1) |

Fig.7B

| ITEM | INSTRUCTIONS |
|---|---|
| S75 | CBT ← YP |
| S76 | START ADDRESS OF THE NEXT LINE |
| S77 | CBB ← (YP-1) |
| S78 | READ ONE LINE OF THE NEXT LINE |
| S79 | BLANK LINE ? |
| S80 | START ADDRESS OF THE NEXT LINE |
| S81 | SBT ← YP |
| S82 | "/" OR ":" CODE PRESENT ? |
| S83 | START ADDRESS OF THE NEXT LINE |
| S84 | READ ONE LINE OF TEXT DATA |
| S85 | SBB ← (YP-1) |
| S86 | IBT ← YP |
| S87 | START ADDRESS OF THE NEXT LINE |
| S88 | READ ONE LINE OF THE NEXT LINE |
| S89 | ENDING CODE PRESENT ? |
| S90 | IBB ← (YP-1) |

Fig.9B

| ITEM | INSTRUCTIONS |
|---|---|
| S110 | READ DATE DATA AND WRITE IT FROM THE CENTER BETWEEN RIGHT AND LEFT MARGIN POSITIONS |
| S111 | STORE THREE LINE FEED CODES |
| S112 | READ ADDRESS DATA AND WRITE IT FROM LEFT MARGIN POSITION |
| S113 | STORE TWO SUCCESSIVE LINE FEED CODES ADJUSTED |
| S114 | READ SALUTATION DATA AND WRITE IT FROM LEFT MARGIN POSITION |
| S115 | STORE ONE LINE FEED CODE |
| S116 | READ LETTER BODY DATA AND WRITE IT FROM LEFT MARGIN POSITION |
| S117 | STORE TWO SUCCESSIVE LINE FEED CODES ADJUSTED |
| S118 | READ CLOSE DATA AND WRITE IT FROM THE CENTER BETWEEN RIGHT AND LEFT MARGIN POSITIONS |
| S119 | STORE THREE LINE FEED CODES |
| S120 | READ SIGNATURE DATA AND WRITE IT FROM THE CENTER BETWEEN RIGHT AND LEFT MARGIN POSITIONS |
| S121 | STORE TWO SUCCESSIVE LINE FEED CODES ADJUSTED |
| S122 | READ INITIAL DATA AND WRITE IT FROM LEFT MARGIN POSITION |
| S123 | SEARCH TOTAL NUMBER OF LINES (L) |
| S124 | $L \leq N$ ? |
| S125 | LINE FEED CODE ERASE PROCESSING |

Fig.10B

| ITEM | INSTRUCTIONS |
|---|---|
| S130 | READ DATE DATA AND WRITE IT FROM THE CENTER BETWEEN RIGHT AND LEFT MARGIN POSITIONS |
| S131 | STORE THREE LINE FEED CODES |
| S132 | READ ADDRESS DATA AND WRITE IT FROM LEFT MARGIN POSITION |
| S133 | STORE TWO SUCCESSIVE LINE FEED CODES ADJUSTED |
| S134 | READ SALUTATION DATA AND WRITE IT FROM LEFT MARGIN POSITION |
| S135 | STORE ONE LINE FEED CODE |
| S136 | READ LETTER BODY DATA AND WRITE IT FROM LEFT MARGIN POSITION |
| S137 | INDENT START POSITION OF EACH PARAGRAPH BY FIVE COLUMNS |
| S138 | STORE TWO SUCCESSIVE LINE FEED CODES ADJUSTED |
| S139 | READ CLOSE DATA AND WRITE IT FROM THE CENTER BETWEEN RIGHT AND LEFT MARGIN POSITIONS |
| S140 | STORE THREE LINE FEED CODES |
| S141 | READ SIGNATURE DATA AND WRITE IT FROM THE CENTER BETWEEN RIGHT AND LEFT MARGIN POSITIONS |
| S142 | STORE TWO SUCCESSIVE LINE FEED CODES ADJUSTED |
| S143 | READ INITIAL DATA AND WRITE IT FROM LEFT MARGIN POSITION |
| S144 | SEARCH TOTAL NUMBER OF LINES (L) |
| S145 | $L \leq N$ ? |
| S146 | LINE FEED CODE ERASE PROCESSING |

Fig.11B

| ITEM | INSTRUCTIONS |
|---|---|
| S150 | READ DATE DATA AND WRITE IT FROM THE CENTER BETWEEN RIGHT AND LEFT MARGIN POSITIONS |
| S151 | STORE THREE LINE FEED CODES |
| S152 | READ ADDRESS DATA AND WRITE IT FROM LEFT MARGIN POSITION |
| S153 | STORE TWO SUCCESSIVE LINE FEED CODES ADJUSTED |
| S154 | READ SALUTATION DATA AND WRITE IT FROM LEFT MARGIN POSITION |
| S155 | STORE ONE LINE FEED CODE |
| S156 | READ LETTER BODY DATA AND WRITE IT FROM LEFT MARGIN POSITION |
| S157 | INDENT START POSITION OF EACH LINE FROM THE SECOND LINE OF EACH PARAGRAPH BY TWO COLUMNS |
| S158 | STORE TWO SUCCESSIVE LINE FEED CODES ADJUSTED |
| S159 | READ CLOSE DATA AND WRITE IT FROM THE CENTER BETWEEN RIGHT AND LEFT MARGIN POSITIONS |
| S160 | STORE THREE LINE FEED CODES |
| S161 | READ SIGNATURE DATA AND WRITE IT FROM THE CENTER BETWEEN RIGHT AND LEFT MARGIN POSITIONS |
| S162 | STORE TWO SUCCESSIVE LINE FEED CODES ADJUSTED |
| S163 | READ INITIAL DATA AND WRITE IT FROM LEFT MARGIN POSITION |
| S164 | SEARCH TOTAL NUMBER OF LINES (L) |
| S165 | $L \leq N$ ? |
| S166 | LINE FEED CODE ERASE PROCESSING |

Fig.12B

| ITEM | INSTRUCTIONS |
|---|---|
| S170 | READ DATE DATA AND WRITE IT FROM THE CENTER BETWEEN RIGHT AND LEFT MARGIN POSITIONS |
| S171 | STORE THREE LINE FEED CODES |
| S172 | READ SALUTATION DATA AND WRITE IT FROM LEFT MARGIN POSITION |
| S173 | STORE ONE LINE FEED CODE |
| S174 | READ LETTER BODY DATA AND WRITE IT FROM LEFT MARGIN POSITION |
| S175 | INDENT START POSITION OF EACH PARAGRAPH BY FIVE COLUMNS |
| S176 | STORE TWO SUCCESSIVE LINE FEED CODES ADJUSTED |
| S177 | READ CLOSE DATA AND WRITE IT FROM THE CENTER BETWEEN RIGHT AND LEFT MARGIN POSITIONS |
| S178 | STORE THREE LINE FEED CODES |
| S179 | READ SIGNATURE DATA AND WRITE IT FROM THE CENTER BETWEEN RIGHT AND LEFT MARGIN POSITIONS |
| S180 | STORE TWO SUCCESSIVE LINE FEED CODES ADJUSTED |
| S181 | READ ADDRESS DATA AND WRITE IT FROM LEFT MARGIN POSITION |
| S182 | STORE TWO SUCCESSIVE LINE FEED CODES ADJUSTED |
| S183 | READ INITIAL DATA AND WRITE IT FROM LEFT MARGIN POSITION |
| S184 | SEARCH TOTAL NUMBER OF LINES (L) |
| S155 | $L \leq N$ ? |
| S186 | LINE FEED CODE ERASE PROCESSING |

August 6, 19X7 ~H

Dear Mr. Gray: ~G

P

Cordially, ~C

Gene O'Connor ~S

A go/mn ~I encs. ~E

FIG.18

AUTOMATIC EDITING DEVICE FOR AN ENGLISH LETTER

This is a continuation of application Ser. No. 08/097,234 filed Jul. 27, 1993, now abandoned.

BACKGROUND OF THE INVENTION

1. Field of the Invention

The present invention relates to an automatic editing device for an English letter. More particularly, the invention relates to an automatic editing device capable of automatically editing an English letter text, including a date block, an address block, etc., to a desired selected English letter format.

2. Description of Related Art

Generally, in many English-speaking countries, such as the United States and the United Kingdom, some letter formats in an English letter are prescribed according to the contents to be described. A test of such an English letter is created and printed on a sheet of paper according to any one of the letter formats by an operator of a word processor or a typewriter.

In such an English letter, there are a plurality of necessary items including a date, an inside address, a salutation such as "Dear . . . ," a letter body, and a complimentary closing such as "Sincerely, . . . ". Further, several kinds of English letter formats, such as a block format, semiblock format and hanging indent format, are selectively used according to the kind of English letter.

These English letter formats are different from each other regarding the necessary items to be described, such as the print start positions of the date and the complimentary close, the indent of the letter body, and the line feed between the adjacent necessary items such as the date and the inside address. These items are generally prescribed for each English letter format.

Accordingly, the operator operates the word processor or the typewriter to manually input the letter format according to the kind of letter. In operation, the operator sequentially moves a cursor position or a carriage position in a printing direction or a paper feeding direction and sequentially inputs and prints the letter text including the date, the inside address, the letter body, etc. on the basis of the format.

As mentioned above, there are several kinds of typical English letter formats in an English letter. Correspondingly, print positions of the necessary items to be described in the letter are prescribed for each English letter format. Accordingly, when the operator has no knowledge regarding English letter formats, the operator cannot easily and accurately create the English letter with a desired format even though the operator knows the desired type of format.

Further, even when the operator knows English letter formats, the operator must sequentially move the cursor position or the carriage position in the printing direction or the paper feeding direction and sequentially input and print the letter text including the date, the inside address, the letter body, etc. based on the desired format. Accordingly, creating an English letter is time consuming and inefficient.

SUMMARY OF THE INVENTION

It is accordingly an object of the present invention to provide an automatic editing device for an English letter, which can automatically edit an input letter text including a date block, an address block, etc. to a desired letter format.

According to the present invention, a text processing device includes input means for inputting English characters and various commands, data storage means for storing text data input from the input means, display means including a display capable of displaying a text, and display control means. An automatic editing device for an English letter is also included and comprises format display control means for displaying a layout of a plurality of English letter formats on the display according to an automatic edit command input from the input means. A format selecting means selects and sets one of the plurality of English letter formats through the layout displayed on the display, and edit control means automatically edits a letter text input from the input means and stored into the data storage means to the English letter format selected and set by the format selecting means. The letter text preferably comprises a date data block, an address block, a salutation block, a letter body block, a close block, and a signature block.

In the automatic editing device according to the present invention, the letter text input from the input means is stored into the data storage means. When the automatic edit command is input from the input means, the format display control means controls the display to show the layout of the plural English letter formats on the display. The format selecting means selects and sets one of the English letter formats through the layout displayed on the display. Then, the edit control means automatically edits the letter text previously stored in the data storage means to the English letter format selected and set by the format selecting means. Thus, when the letter text is input and stored and a desired one of the English letter formats is selected and set, the letter text is automatically edited to the desired English letter format selected above. Accordingly, even an operator having no knowledge of English letter formats can easily and accurately create a letter text with a desired English letter format. Further, in printing the English letter, it is unnecessary for the operator to sequentially move a cursor position or a carriage position in a printing direction or a paper feeding direction, thereby improving efficiency in creating of the letter text.

BRIEF DESCRIPTION OF THE DRAWINGS

A preferred embodiment of the present invention will be described in detail with reference to the following figures wherein:

FIG. 6B is a chart listing the steps of the flowchart of FIG. 6A;

FIG. 7B is a chart listing the steps of the flowchart of FIG. 7A;

FIG. 9B is a chart listing the steps of the flowchart of FIG. 9A;

FIG. 10B is a chart listing the steps of the flowchart of FIG. 10B;

FIG. 11B is a chart listing the steps of the flowchart of FIG. 11A;

FIG. 12B is a chart listing the steps of the flowchart of FIG. 12A;

FIG. 18 is a schematic illustration of a print of the English letter text edited to the official style format.

DETAILED DESCRIPTION OF PREFERRED EMBODIMENTS

A preferred embodiment of the present invention is described with reference to the drawings. The preferred embodiment is applied to an English word processor provided with a CRT display unit.

Figure 1:
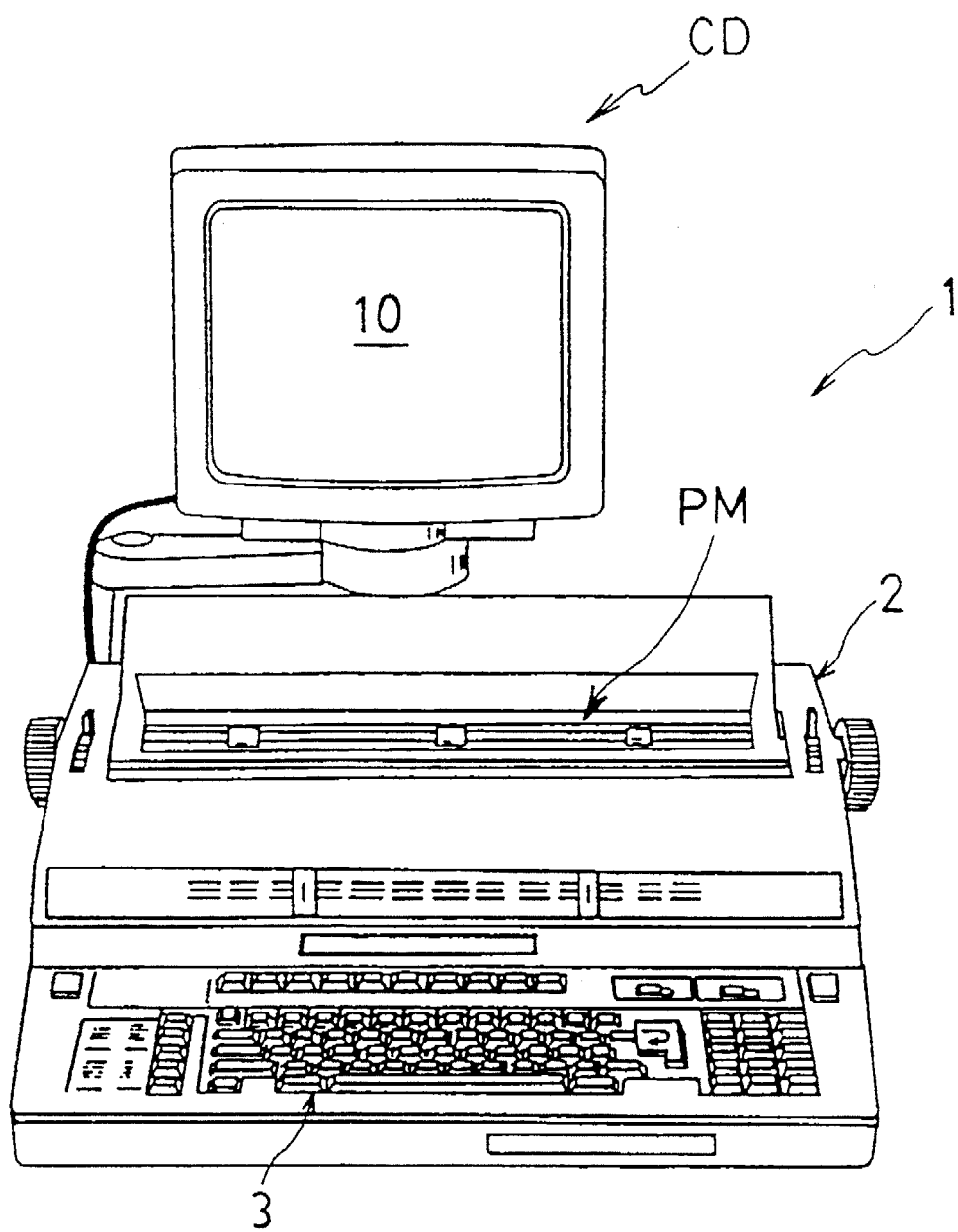
FIG. 1 is a perspective view of a word processor.

Referring to FIG. 1, reference numeral 1 generally designates a word processor including a body frame 2, a keyboard 3 provided at the front portion of the body frame 2, a known printing mechanism PM provided in the body frame 2 behind the keyboard 3, and a CRT display unit CD. The display unit CD is supported by the body frame 2 over the rear portion thereof.

The keyboard 3 includes character keys for inputting characters, such as for example alphabetical letters, numerals and symbols. The keyboard 3 also has a space key, a return key, cursor moving keys for moving a cursor in the vertical and horizontal directions on a screen of the CRT display unit CD, an execution key for executing various editing functions, and an automatic edit key for automatically editing text data of an English letter. Various function keys are also provided for performing input processing and edit processing of the text data.

The printing mechanism PM principally includes a mechanical component for moving a carriage and its drive motor, a mechanical component for feeding a sheet of print paper and its drive motor, a daisy wheel and its drive motor, and a printing hammer and its drive solenoid.

Figure 2:
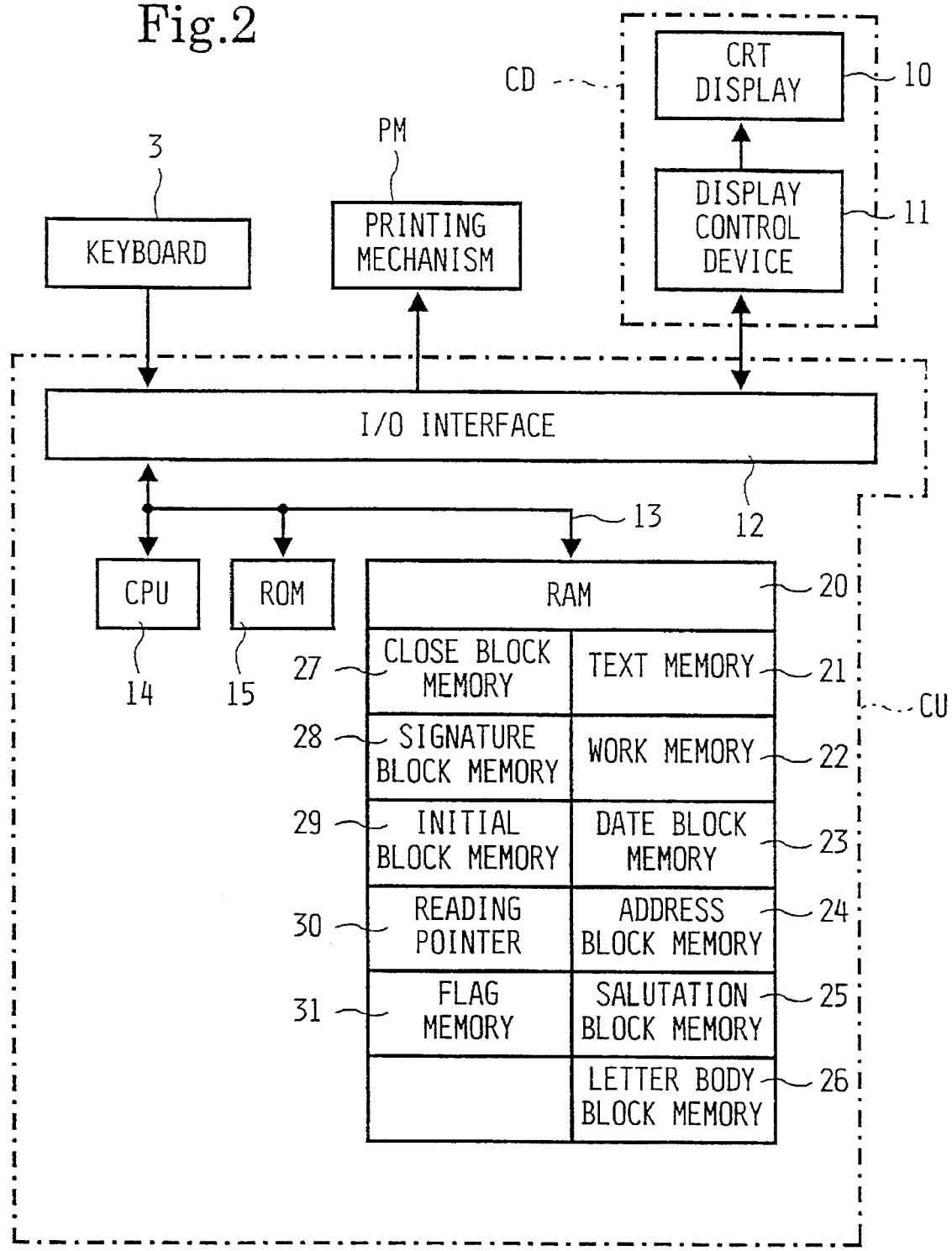
FIG. 2 is a block diagram of a control system in the word processor.

A control system of the word processor 1 is constructed as shown in the block diagram of FIG. 2.

As shown in FIG. 2, the keyboard 3, the printing mechanism PM and the CRT display unit CD are connected to a control unit CU. The CRT display unit CD comprises a display control device 11 and a CRT display 10. The display control device 11 comprises a display CPU, a ROM, a RAM, a character generator, and a CRT controller, which are connected to the display CPU.

The control unit CU comprises a CPU 14, an I/O interface 12, a ROM 15, and a RAM 20, which are connected to the CPU 14 through a bus 13 such as a data bus. The I/O interface 12 is connected with the keyboard 3, the printing mechanism PM and the CRT display unit CD.

The ROM 15 preliminarily stores a display drive control program for controlling the display control device 11 in accordance with character codes corresponding to characters inclusive of alphabetical letters, numerals and symbols input from the keyboard 3. A print drive control program for controlling the printing mechanism PM according to text data stored in the RAM 20 is also stored in the ROM 15. In addition, a control program for controlling automatic edit processing for an English letter, characteristic to the present invention, is stored in the ROM 15. The ROM 15 further stores print format information for printing of text data on an A4-sized print paper as an English letter. Such print format information includes right and left margin data as the numbers of columns to be defined in the blank areas at the right and left end portions of the print paper. Top and bottom margin data as the numbers of lines to be defined in the blank areas at the upper and lower end portions of the print paper and printable line data as the maximum number of lines allowed to be printed on the print paper are also stored in the ROM 15 as print format information.

The RAM 20 includes the following memories: a text memory 21 for storing code data of characters input from the keyboard 3 as text data; and a work memory 22 for temporarily storing the text data in executing edit control. The RAM 20 also has a date block memory 23 for storing a range of date data of the text data stored in the text memory 21, that is, storing a start address HBT and an end address HBB of a date block H. An address block memory 24 stores a range of address data of the text data stored in the text memory 21, that is, storing a start address ABT and an end address ABB of an address block A. A salutation block memory 25 stores a range of salutation data of the text data stored in the text memory 21, that is, storing a start address GBT and an end address GBB of a salutation block G. A letter body block memory 26 stores a range of letter body data of the text data stored in the text memory 21, that is, storing a start address PBT and an end address PBB of a letter body block P, which consists of a plurality of paragraphs. A close block memory 27 stores a range of close data of the text data stored in the text memory 21, that is, storing a start address CBT and an end address CBB of a close block C. A signature block memory 28 stores a range of signature data of the text data stored in the text memory 21, that is, storing a start address SBT and an end address SBB of a signature block S. An initial block memory 29 stores a range of initial data of the text data stored in the text memory 21, that is, storing a start address IBT and an end address IBB of an initial block I. A reading pointer (pointer value YP) 30 stores one address in the text memory 21, to read the text data. Additionally, the RAM 20 has a flag memory 31 for storing flag data of a block format flag BLF to be set if a block format is selected, flag data of a semiblock format flag SBF to be set if a semiblock format is selected, flag data of a hanging indent format flag HIF to be set if a hanging indent format is selected, flag data of an official style format flag OSF to be set if an official style format is selected, and flag data of an edit ending flag EF to be set if edit processing is ended.

A typical English letter basically comprises a date, an inside address (address and name of an addressee), a salutation such as "Dear . . . ," a body of the letter, a complimentary close such as "Sincerely, . . . ," a signature of an addresser, initials of a typist, and enclosure remarks if any.

Further, a known typical format of an English letter is generally classified into a block format where the date, the complimentary close and the signature of the addresser are located at the center between the right and left margin positions and each line of the letter body starts at the left margin position. There is also a semiblock format where a start position of each paragraph of the letter body is indented by 5 to 10 columns in the block format. A hanging indent format is known where a start position of each line from the second line in each paragraph of the letter body is indented by several columns in the block format. Additionally, there is an official style format where the inside address is located next to the signature of the addresser in the semiblock format.

Figure 3:
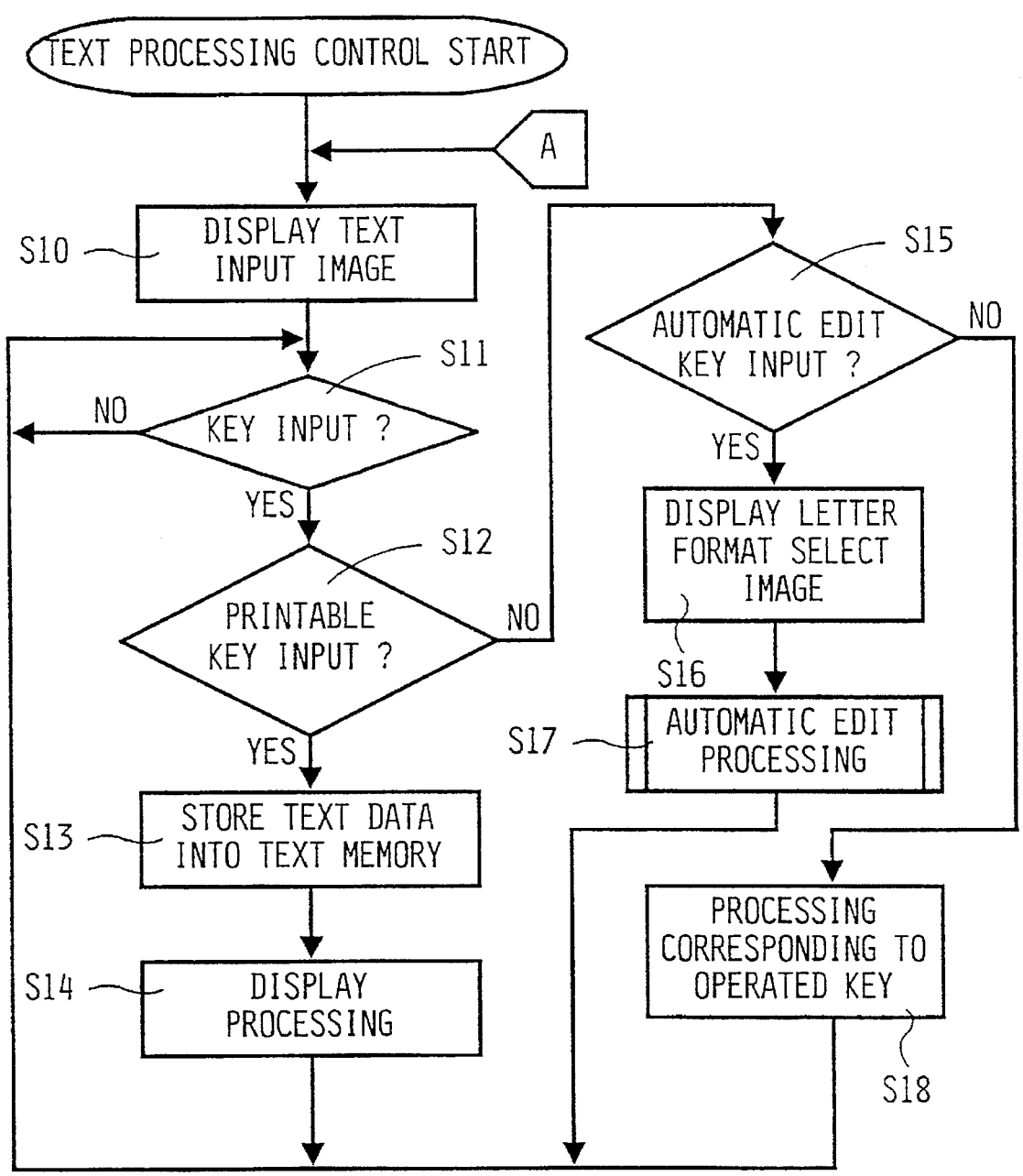
FIG. 3 is a schematic flowchart of a routine of text processing control.

A routine of text processing control to be carried out by the control unit CU of the word processor 1 is described with reference to the flowchart shown in FIG. 3. In FIG. 3 and the other figures, the symbols Si (where i=10, 11, 12, . . . ) represent steps in the control flow.

When a power switch (not shown) is operated to turn on the device, this control is started. At this time, a basic text creating mode is set to allow input of text data, and a text input image is displayed on the CRT display 10 (S10). In this preferred embodiment, a format dedicated for an English letter is applied as an initial print format. In the English letter dedicated format, the numbers of lines for top and bottom margins, the number of columns for right and left margins, the maximum number of lines allowed to be printed on a sheet of paper for the English letter, and the maximum number of characters per line, for example, are previously stored.

Figure 14:
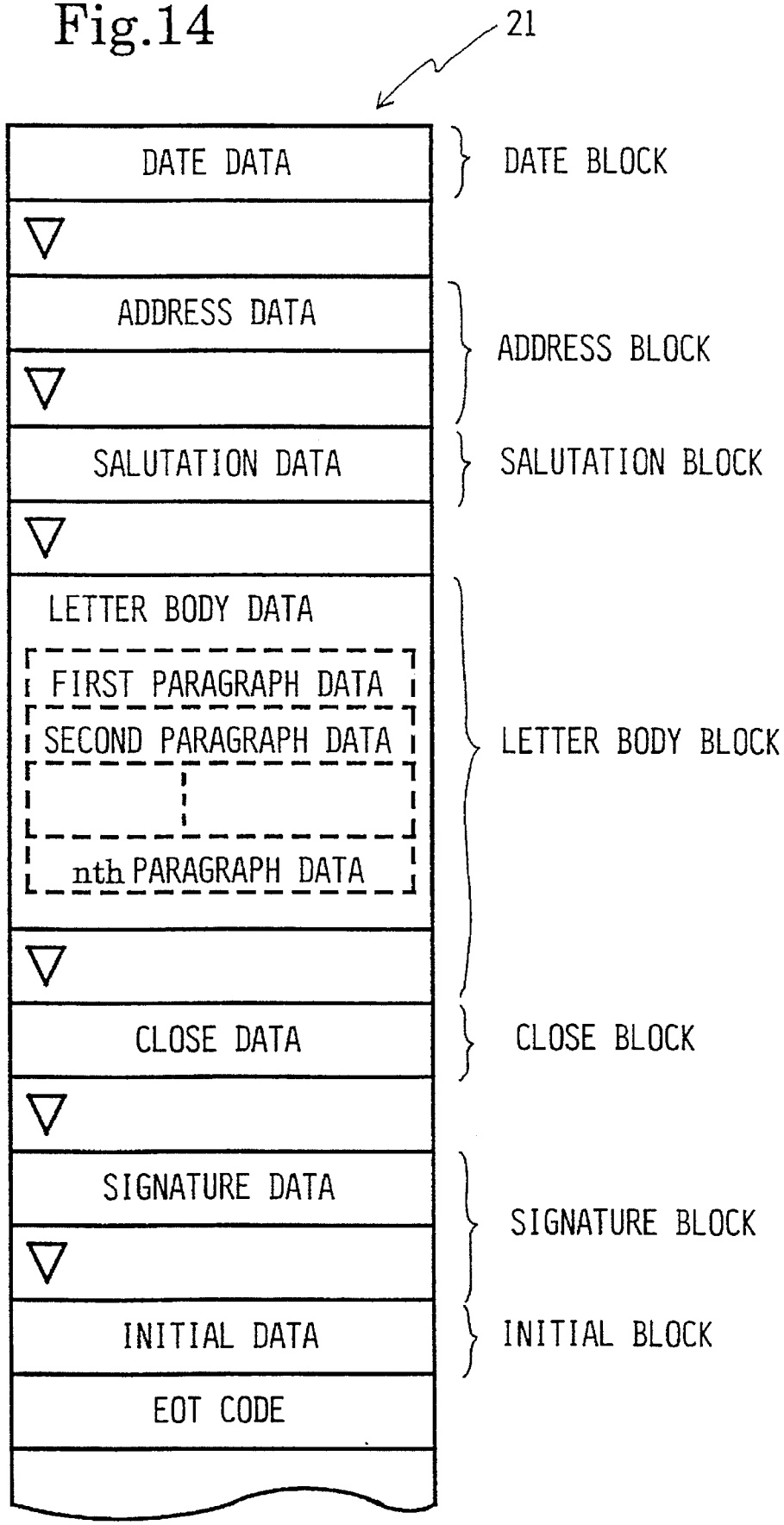
FIG. 14 is a schematic illustration of a construction of text data stored in a text memory.

If printable keys such as the character keys and the space key are operated (S11, S12: Yes), code data corresponding to the printable keys are stored as the text data into the text memory 21 (S13), and characters corresponding to the code data are displayed on the CRT display 10 (S14). Then, the program returns to S11. Accordingly, the text data of the English letter input from the keyboard 3 are displayed on the CRT display 10. FIG. 18 shows an example of a print of the text data on a print paper PA. The print of the text data is composed of a date block H, address block A, salutation block G, letter body block P, close block C, signature block S, initial block I and enclosure block E. These blocks are sequentially input in this order, and a line feed code is input between the adjacent blocks. Accordingly, as shown in FIG. 14, date data, address data, salutation data, letter body data, close data, signature data and initial data are sequentially stored into the text memory 21. The line feed code is stored between the adjacent data. It is noted that the initial data also includes enclosure data.

Next, if an automatic edit key is operated to automatically edit the text data of the English letter to a desired letter format (S11: Yes; S12: No; S15: Yes), a letter format select image is displayed on the CRT display 10 (S16), and automatic edit processing control (see FIGS. 4 to 12) is executed (S17). Then, the program returns to S11. Further, if any key other than the printable keys and the automatic edit key is operated (S11: Yes; S12, S15: No), processing corresponding to the key operated is executed (S18). Then, the program returns to S11.

Figure 15:
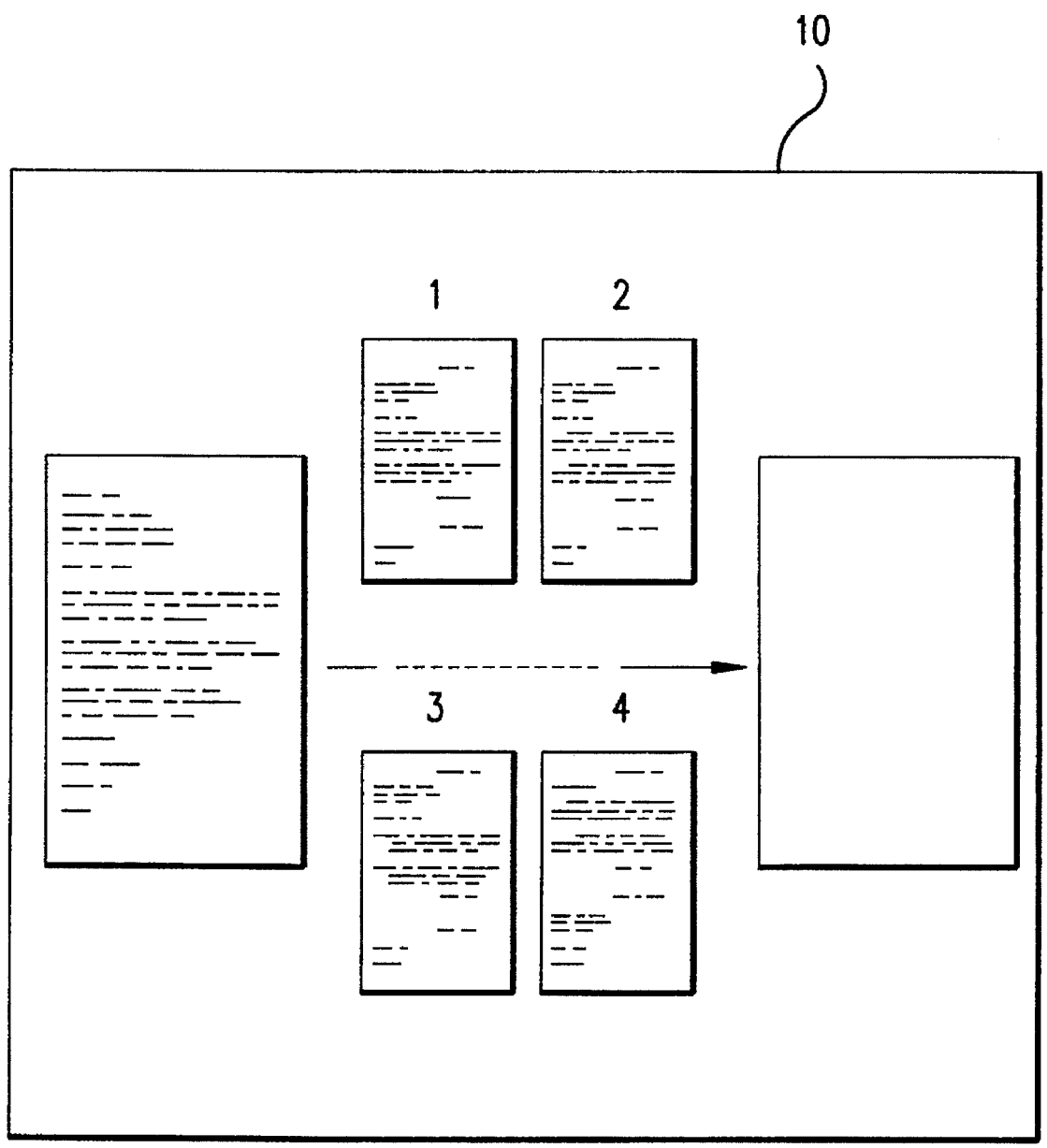
FIG. 15 is a schematic illustration of a letter format select image on a CRT display.

As illustrated in FIG. 15, the letter format select image is a layout of the text data of the original English letter displayed on the CRT display 10 at the left end portion thereof and a layout of the four selectable letter formats displayed on the CRT display 10 at the central portion thereof. The four selectable letter formats are the block format identified as a numeral "1," the semiblock format identified as a numeral "2," the hanging indent format identified as a numeral "3," and the official style format identified as a numeral "4".

Figure 4:
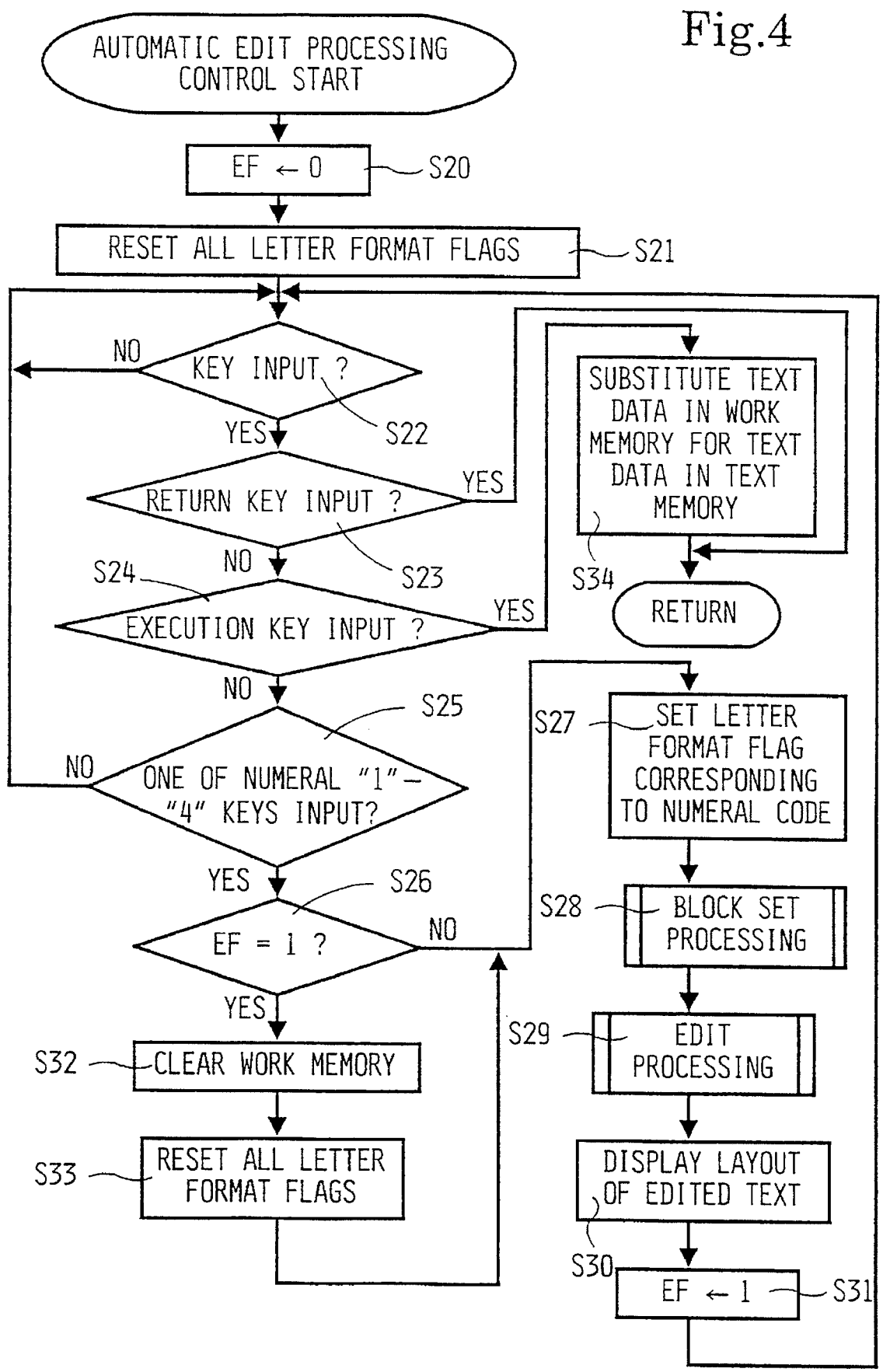
FIG. 4 is a schematic flowchart of a routine of automatic edit processing control for an English letter.

Referring to FIG. 4, when the automatic edit processing control is started, the edit ending flag EF is first reset (S20), and all the letter format flags, i.e., the block format flag BLF, the semiblock format flag SBF, the hanging indent format flag HIF and the official style format flag OSF, are reset (S21).

Next, if any one of the numeral "1"–"4" keys is operated to select a desired one of the four letter formats (S22: Yes; S23, S24: No; S25: Yes), the letter format flag corresponding to the numeral code is set (S27) since the edit ending flag EF remains reset (S26: No). Then, a block set processing control (see FIG. 5) for setting the blocks of the date data, the address data, the salutation data, etc. is executed (S28).

Figure 5:
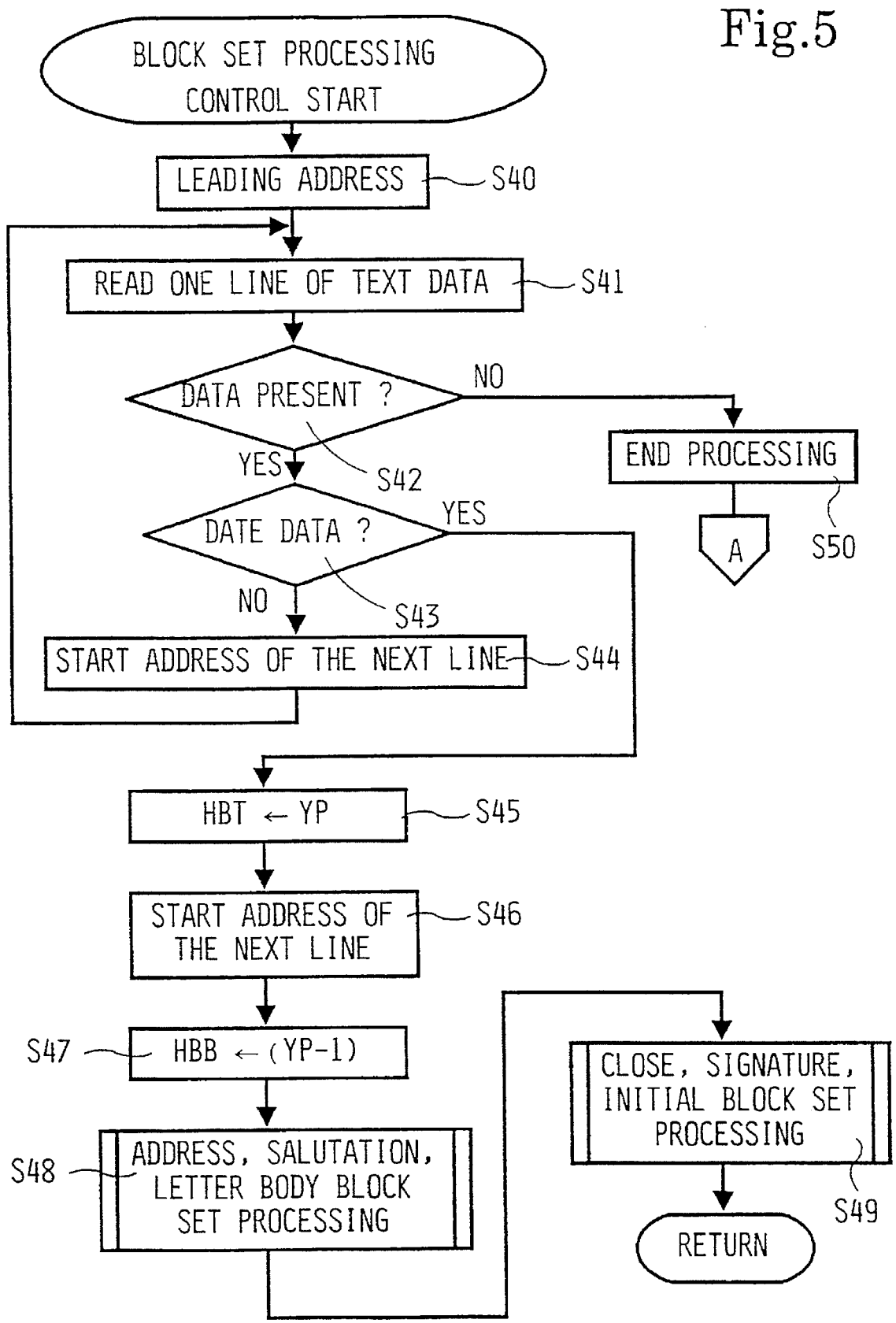
FIG. 5 is a schematic flowchart of a routine of block set processing control.

Referring to FIG. 5, when this control is started, a leading address in the text memory 21 is stored as the reading pointer value YP (S40). One line of the text data is read at a time until the next line feed code (also inclusive of a soft line feed code) is read according to this pointer value YP (S41). Then, if the text data is present in this line (S42: Yes) and it is not the date data containing a month, i.e., "January," "February" . . . "December" (S43: No), a start address of the next line in the text memory 21 is set to the reading pointer value YP (S44). Then, S41 to S44 are repeated. In the course of this repetition, if the text data of one line is the date data (S43: Yes), the pointer value YP is stored as the start address HBT of the date block H into the data block memory 23 (S45).

Then, a start address of the next line is set to the reading pointer value YP since the date data is located in only one line (S46). An address just before the pointer value YP is stored as the end address HBB of the date block H (S47).

Next, address, salutation and letter body block set processing control (see FIGS. 6A and 6B) is executed (S48).

Figure 6A:
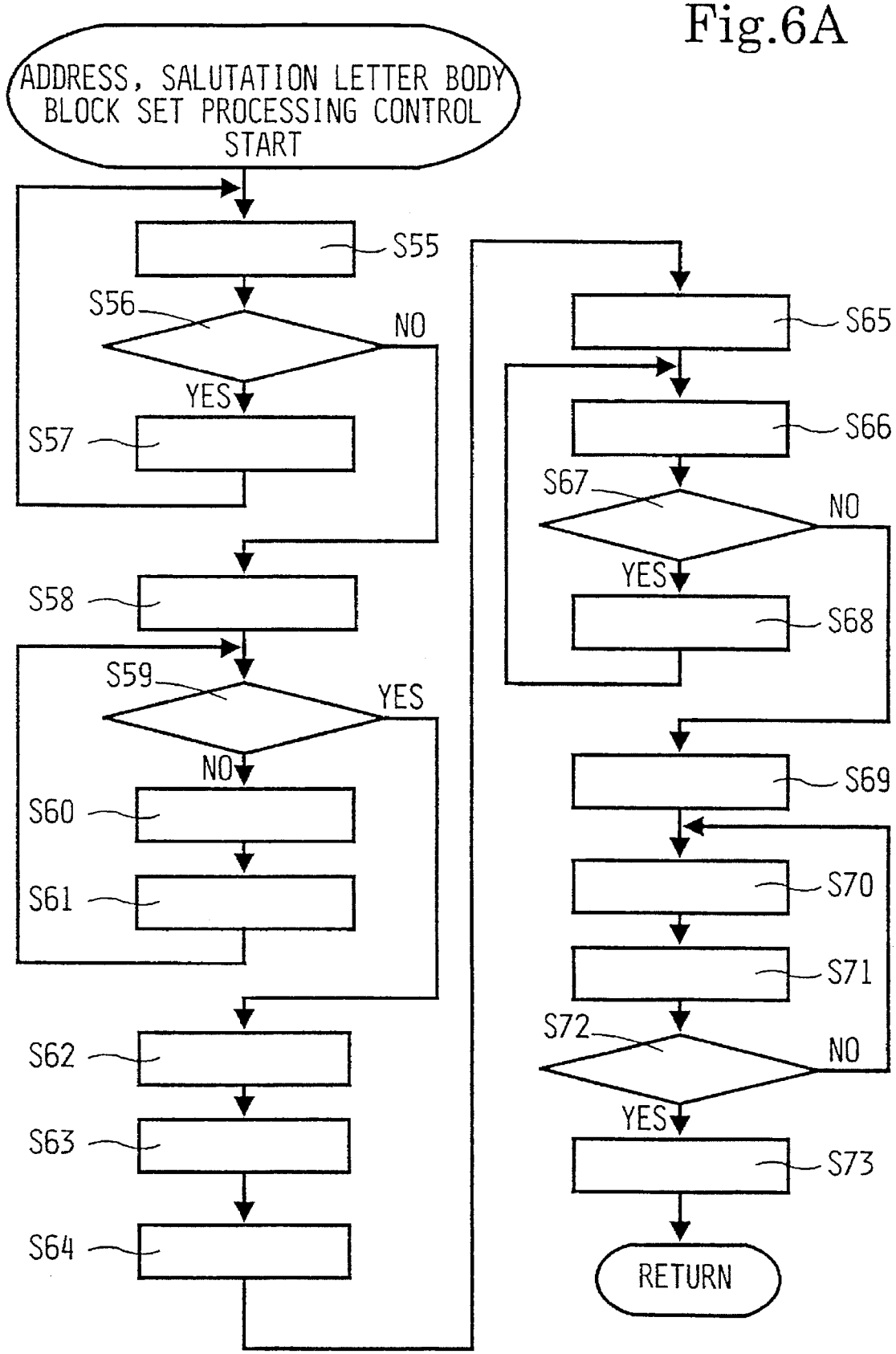
FIG. 6A is a schematic flowchart of a routine of address, salutation, letter body block set processing control.

Referring to FIG. 6A, when this control is started, one line of the text data is read according to the pointer value YP (S55). If this one line is a blank line (S56: Yes), a start address of the next line is set to the reading pointer value YP (S57). If the text data is present in this line (S56: No), the pointer value YP is stored as the start address ABT of the address block A into the address block memory 24 (S58).

If the text data read above is not the salutation data containing a word or phrase of salutation, such as "Dear" or "Ladies and Gentlemen" (S59: No), a start address of the next line is set to the reading pointer value YP (S60). Next one line of the text data is read (S61). Then, S59 to S61 are repeated. In the course of this repetition, if the text data of one line is salutation data (S59: Yes), an address just before the pointer value YP is stored as the end address ABB of the address block A (S62).

Further, the pointer value YP is stored as the start address GBT of the salutation block G into the salutation block memory 25 (S63). Then, a start address of the next line is set to the reading pointer value YP since the salutation data is located in only one line (S64). An address just before the pointer value YP is stored as the end address GBB of the salutation block G (S65).

Then, one line of the text data is read (S66). If this one line is a blank line (S67: Yes), a start address of the next line is set to the reading pointer value YP (S68). Then, S66 to S68 are repeated. If the text data is present in one line read above (S67: No), the pointer value YP is stored as the start address PBT of the letter body block P into the letter body block memory 26 (S69).

Then, a start address of the next line is set to the reading pointer value YP (S70), and one line of the text data is read (S71). If the text data of this one line is not the close data containing the word or phrase of a complimentary closing such as "Sincerely," (S72: No), S70 to S72 are repeated. In the course of this repetition, if the text data of one line is the close data (S72: Yes), an address just before the pointer value YP is stored as the end address PBB of the letter body block P (S73). Then, this control is ended to proceed to S49 in the block set processing control shown in FIG. 5.

Next, close, signature and initial block set processing control (see FIGS. 7A and B) is executed (S49).

Figure 7A:
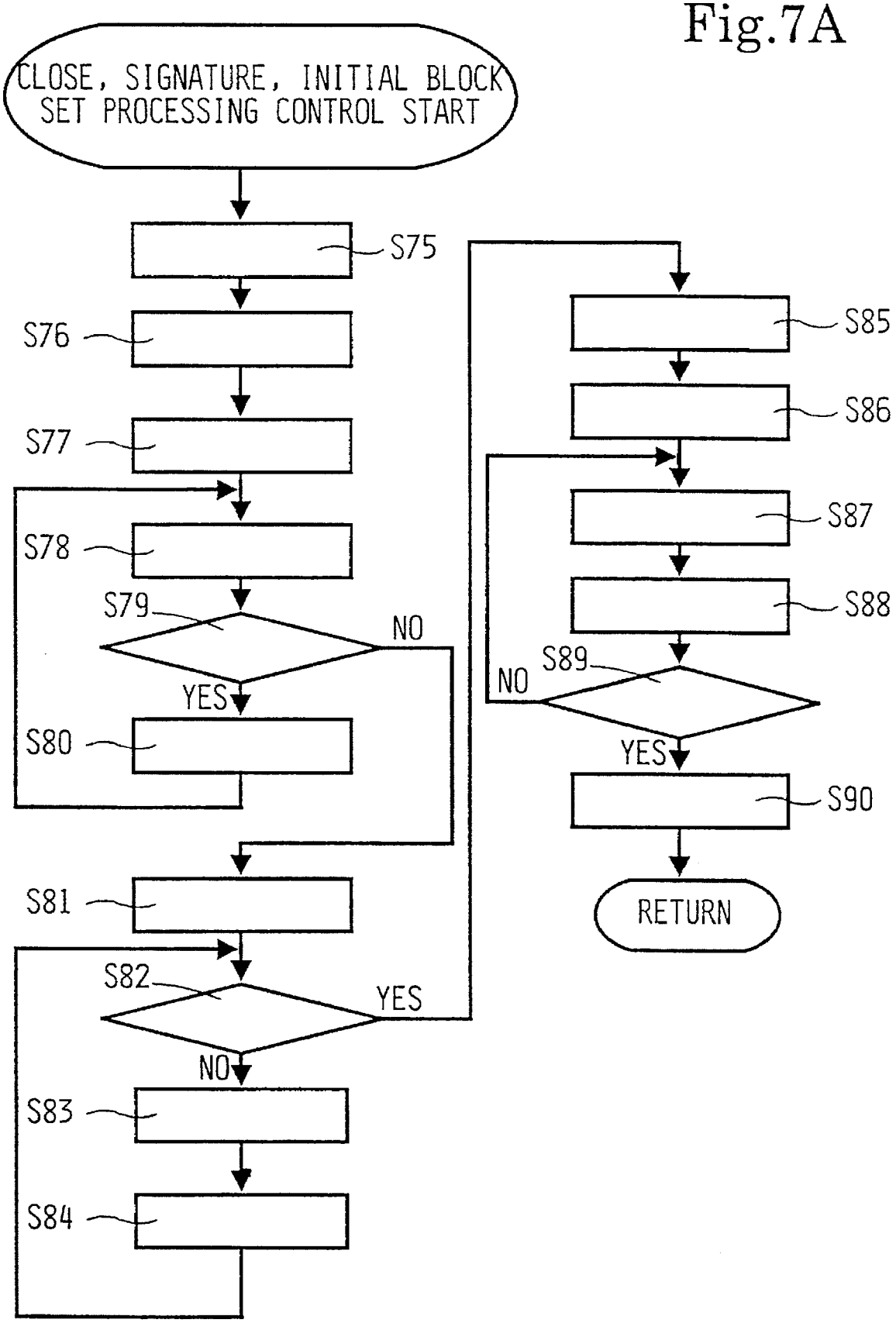
FIG. 7A is a schematic flowchart of a routine of close, signature, initial block set processing control.

Referring to FIG. 7A, when this control is started, the pointer value YP is stored as the start address CBT of the close block C into the close block memory 27 (S75). Then, a start address of the next line is set to the reading pointer value YP since the close data is located in only one line (S76), and an address just before the pointer value YP is stored as the end address CBB of the close data C (S77). Then, similar to S55 to S57, if the text data is read after detection of a blank line (S78; S79: No), the pointer value YP is stored as the start address SBT of the signature block S into the signature block memory 28 (S81).

Then, similar to S59 to S61, until the initial data containing a symbol "/" or ":" is detected in the text data read above, a start address of the next line is sequentially set to the reading pointer value YP (S82 to S84). If the initial data is detected (S82: Yes), an address just before the pointer value YP is stored as the end address SBB of the signature block S (S85).

Then, the pointer value YP is stored as the start address IBT of the initial block I into the initial block memory 29 (S86). Then, until the ending code (e.g., EOT code) is detected in the text data, a start address of the next line is sequentially set to the reading pointer value YP (S87 to S89), to detect a final position of the initial block I, i.e., a final position of the text in the English letter. If the ending code is detected (S89: Yes), an address just before the pointer value YP is stored as the end address IBB of the initial block I (S90). Then, this control is ended, and the block set processing control is also ended to proceed to S29 in the automatic edit processing control shown in FIG. 4. Then, edit processing control (see FIG. 8) is executed (S29).

Figure 8:
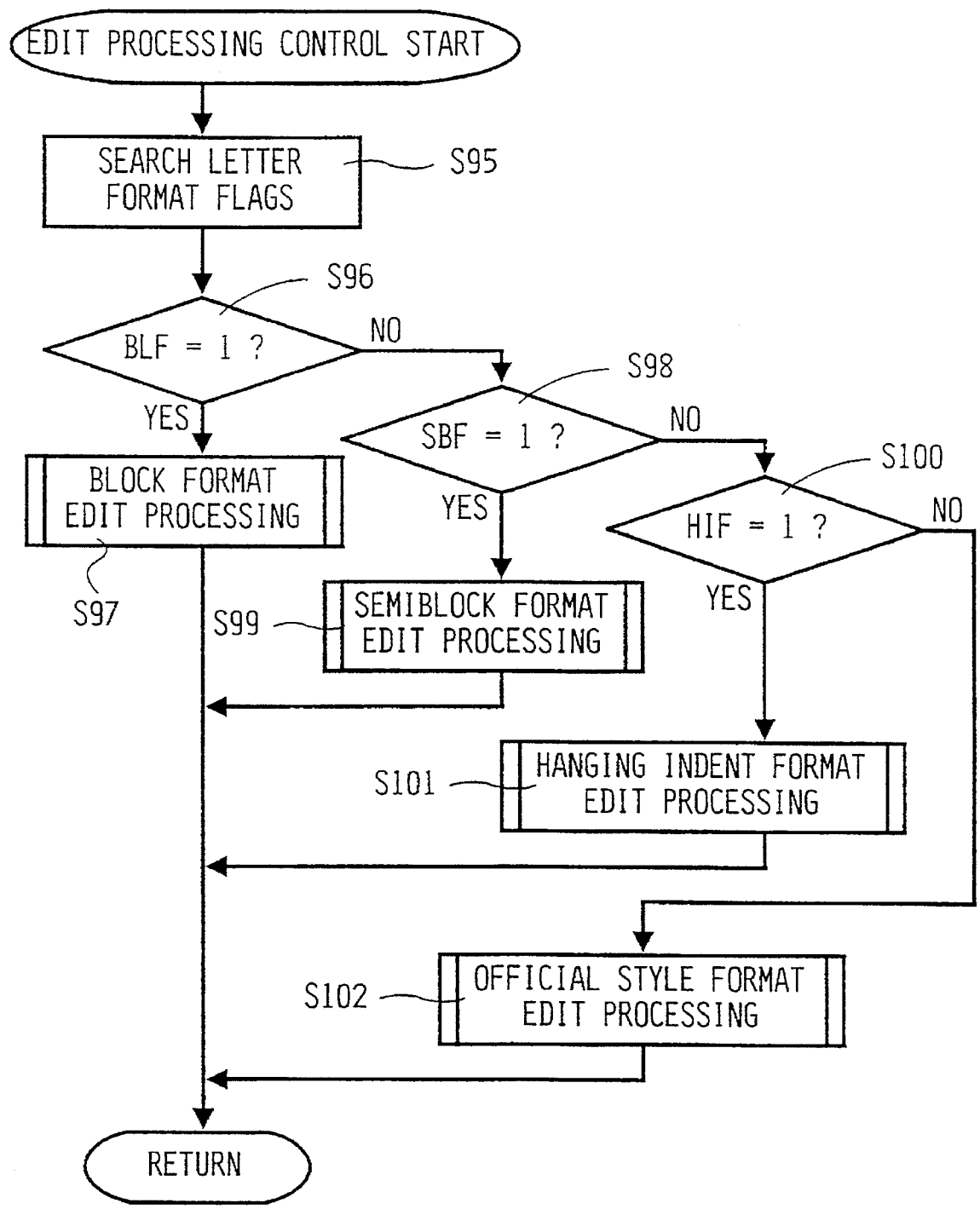
FIG. 8 is a schematic flowchart of a routine of edit processing control.

Referring to FIG. 8, when this control is started, the format flag in the set state is searched according to the flag data in the flag memory 31 (S95). If the block format flag BLF is in the set state (S96: Yes), block format edit processing control (see FIGS. 9A and 9B) is executed (S97). Then, the program proceeds to S30 in the automatic edit processing control. If the semiblock format flag SBF is in the set state (S96: No; S98: Yes), semiblock format edit processing control (see FIGS. 10A and 10B) is executed (S99). Then, the program proceeds to S30. If the hanging indent format flag HIF is in the set state (S96, S98: No; S100: Yes), hanging indent format edit processing control (see FIGS. 11A and 11B) is executed (S101). Then, the program proceeds to S30. If the official style format flag OSF is in the set state (S96, S98, S100: No), official style format edit processing control (see FIGS. 12A and 12B) is executed (S102). Then, the program proceeds to S30.

Figure 9A:
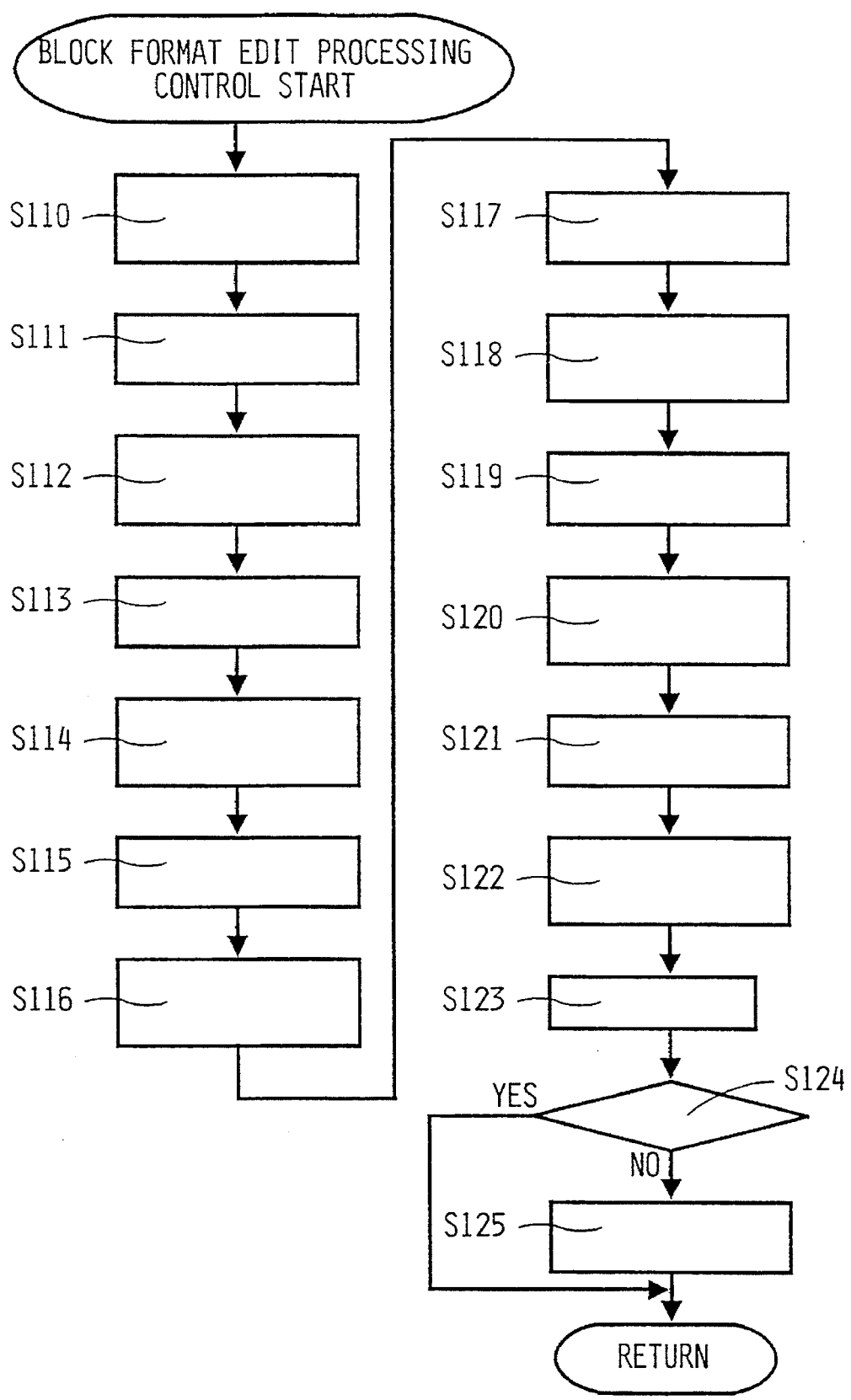
FIG. 9A is a schematic flowchart of a routine of block format edit processing control.

Referring to FIGS. 9A and 9B, when the block format edit processing control is started, the date data is read from the text memory 21 according to the start address HBT and the end address HBB stored in the date block memory 23. The date data is then sequentially written into the work memory 22 from an address corresponding to the center between the right and left margin positions on a leading line in a print area based on the block format (S110). Then, three line feed codes are further stored (S111). Next, the address data is read from the text memory 21 according to the start address ABT and the end address ABB stored in the address block memory 24, and is sequentially written into the work memory 22 from an address corresponding to the left margin position (S112). Then, two successive line feed codes (inclusive of a line feed code on the last line of the address data) are stored (S113).

The salutation data is read from the text memory 21 according to the start address GBT and the end address GBB stored in the salutation block memory 25 and is sequentially written into the work memory 22 from an address corresponding to the left margin position (S114). Then, one line feed code is further stored (S115). The letter body data is read from the text memory 21 according to the start address PBT and the end address PBB stored in the letter body block memory 26 and is sequentially written into the work memory 22 from an address corresponding to the left margin position (S116). Next, two successive line feed codes (inclusive of a line feed code on the last line of the letter body data) are stored (S117).

Then, the close data is read from the text memory 21 according to the start address CBT and the end address CBB stored in the close block memory 27 and is sequentially written into the work memory 22 from an address corresponding to the center between the right and left margin positions (S118). Next, three line feed codes are further stored (S119). The signature data is read from the text memory 21 according to the start address SBT and the end address SBB stored in the signature block memory 28 and is sequentially written into the work memory 22 from an address corresponding to the center between the right and left margin positions (S120). Then, two successive line feed codes (inclusive of a line feed code on the line of the signature data) are stored (S121).

At step S122, the initial data is read from the text memory 21 according to the start address IBT and the end address IBB stored in the initial block memory 29 and is sequentially written into the work memory 22 from an address corresponding to the left margin position.

Then, the total number of lines L is searched according to the line feed codes stored in the work memory 22 (S123). If the total number of lines L is not larger than the maximum number of printable lines N prescribed for the English letter format (S124: Yes), it is determined that the text data stored in the work memory 22 can be printed on the A4-sized print paper, and this control is ended. However, if the total number of lines L is larger than the maximum number of printable lines N (S124: No), the line feed codes corresponding to three or more blank lines are sequentially erased (S125), and this control is ended.

Figure 10A:
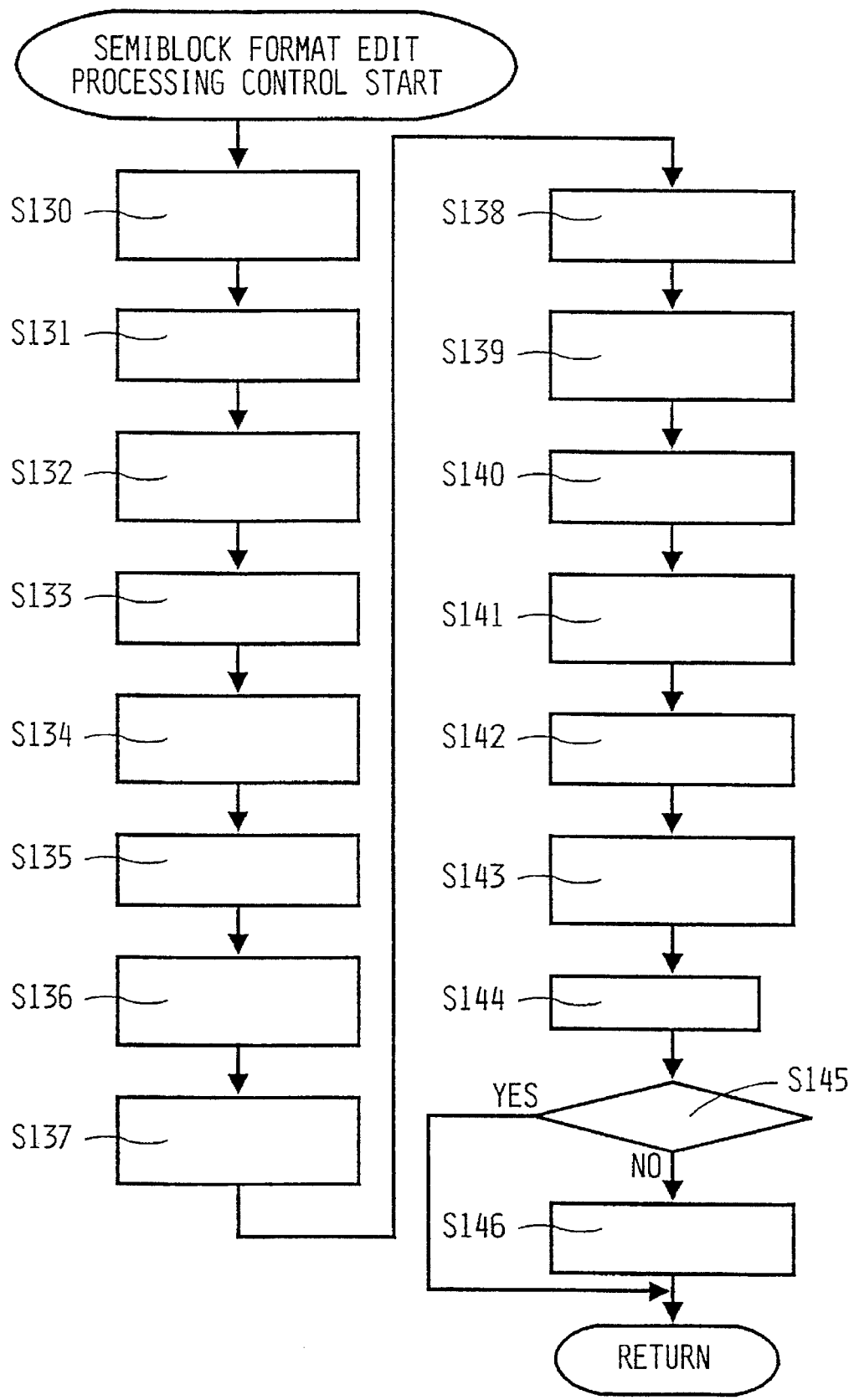
FIG. 10A is a schematic flowchart of a routine of semi-block format edit processing control.

Referring next to FIGS. 10A and 10B, the semiblock format edit processing control is basically the same as the block format edit processing control mentioned above. Therefore, only the different parts are described. Specifically, the letter body data is read from the text memory 21 according to the start address PBT and the end address PBB stored in the letter block memory 26, and is sequentially written into the text memory 22 from an address corresponding to the left margin position (S136). Then, a start position of each paragraph constituting the letter block is indented by five columns (S137).

Figure 11A:
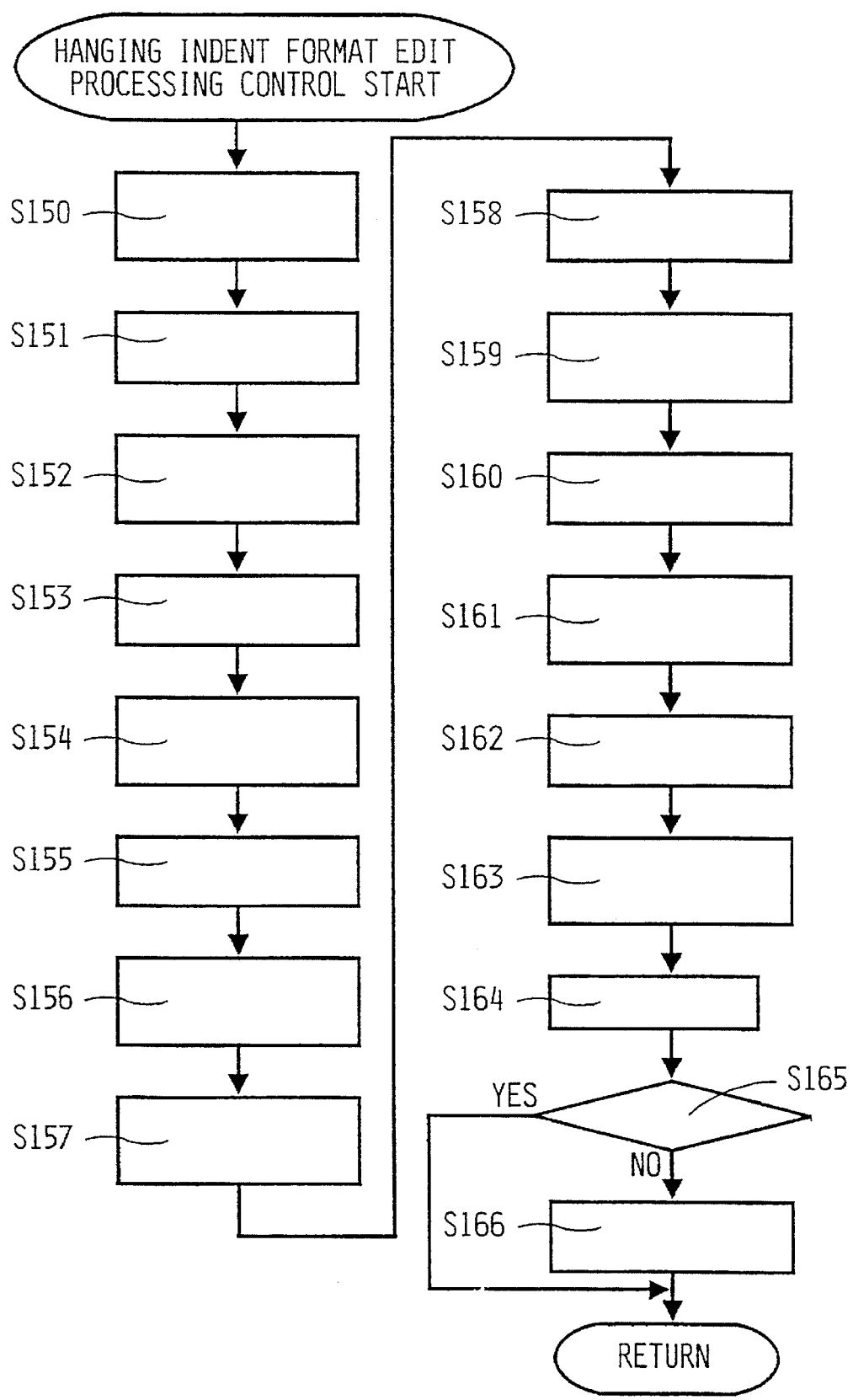
FIG. 11A is a schematic flowchart of a routine of hanging indent format edit processing control.

Referring next to FIGS. 11A and 11B, the hanging indent format edit processing control also basically the same as the block format edit processing control mentioned above. Therefore, only the different parts are described. In particular, the letter body data is read from the text memory 21 according to the start address PBT and the end address PBB stored in the letter body block memory 26, and is sequentially written into the work memory 22 from an address corresponding to the left margin position (S156). Then, a start position of each line from the second line in each paragraph constituting the letter body is indented by two columns (S157).

Figure 12A:
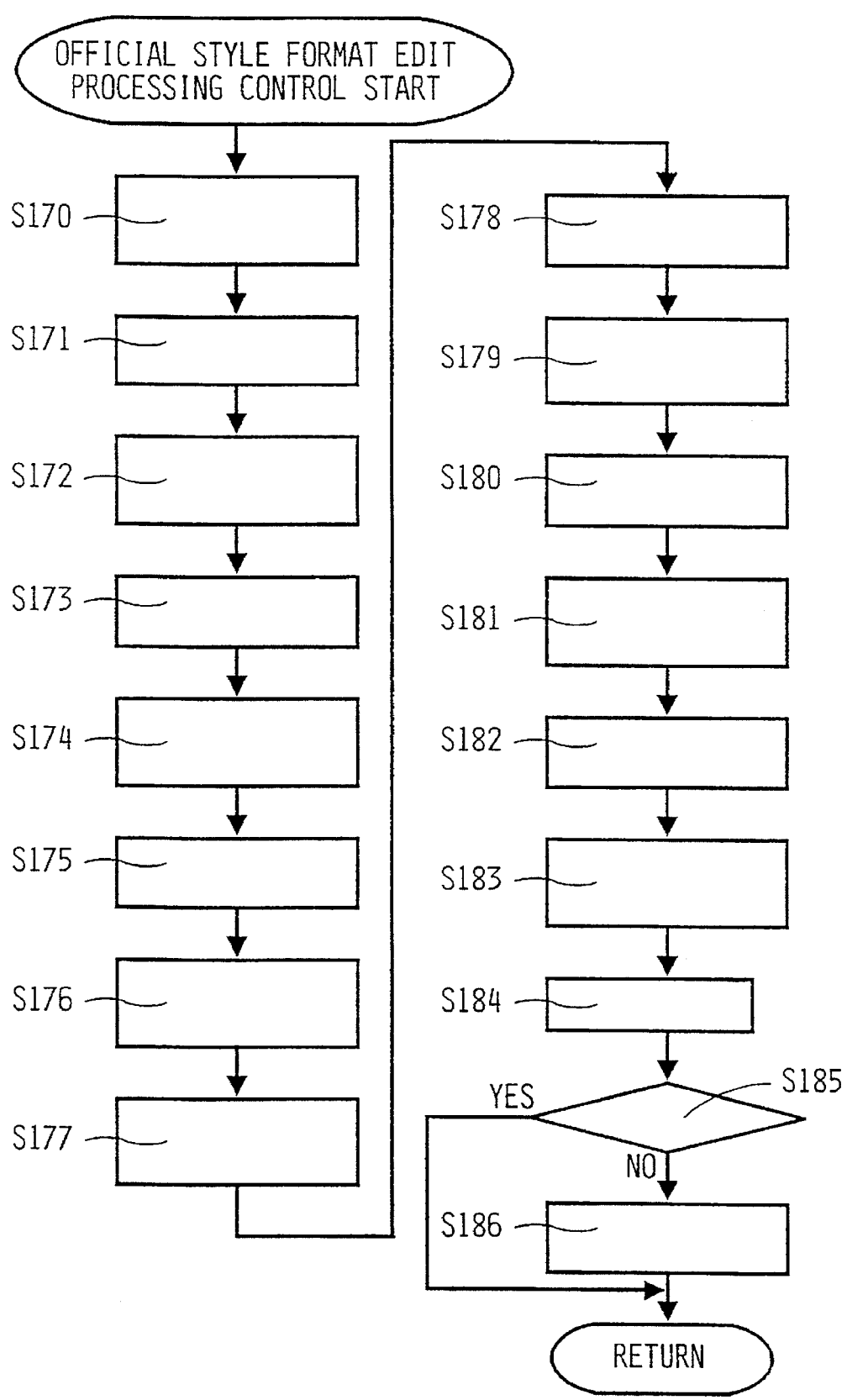
FIG. 12A is a schematic flowchart of a routine of official style format edit processing control.

Referring next to FIGS. 12A and 12B, the official style format edit processing control is basically the same as the semiblock format edit processing control mentioned above. Therefore, only the different parts are described. In the semiblock format edit processing control, the date data, the address data, the salutation data, the letter body data, the close data, the signature data and the initial data are controlled to be sequentially written in this order into the work memory 22. To the contrary, in the official style format edit processing control, the address data is controlled to be shifted next to the signature data and be written into the work memory 22 (S172 to S181).

Figure 16:
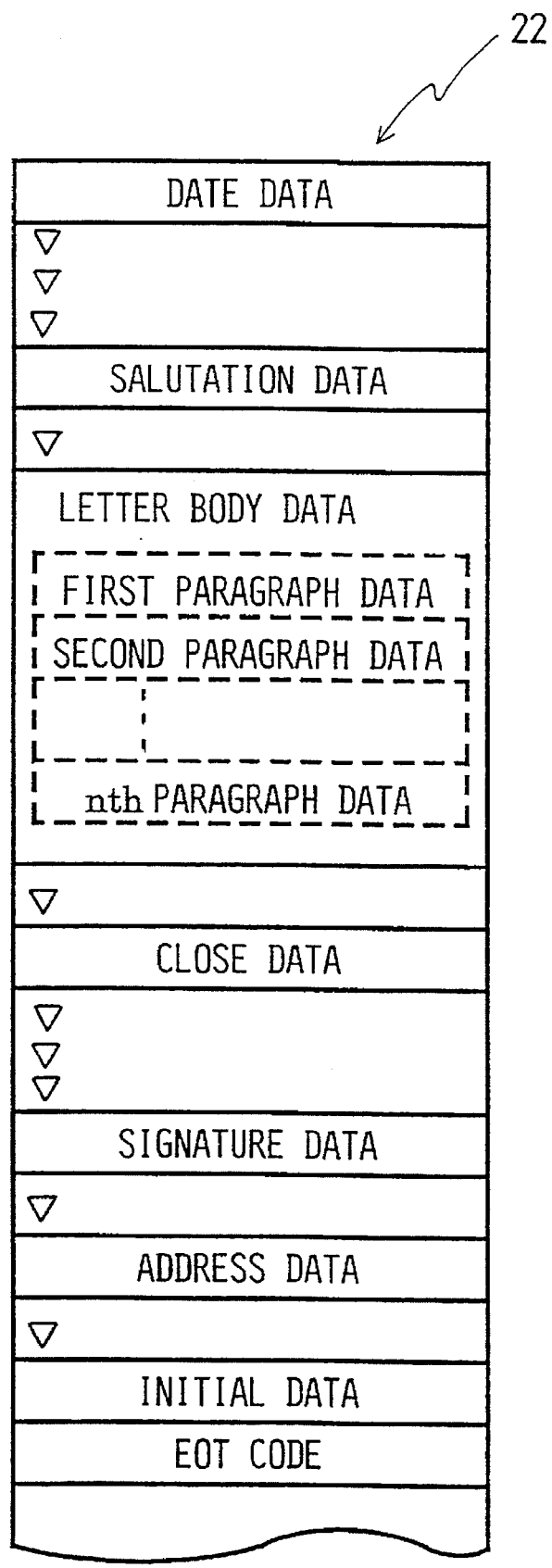
FIG. 16 is a schematic illustration of a construction of text data stored in a work memory after edited to an official style format.

Accordingly, in editing the letter text for the official style format, the text data of the English letter stored in the text memory 21 as shown in FIG. 14 is read out and written into the work memory 22 so that the line feed codes are suitably interposed between the adjacent data blocks. Also, the address data is shifted adjacent to the signature data as shown in FIG. 16.

Figure 17:
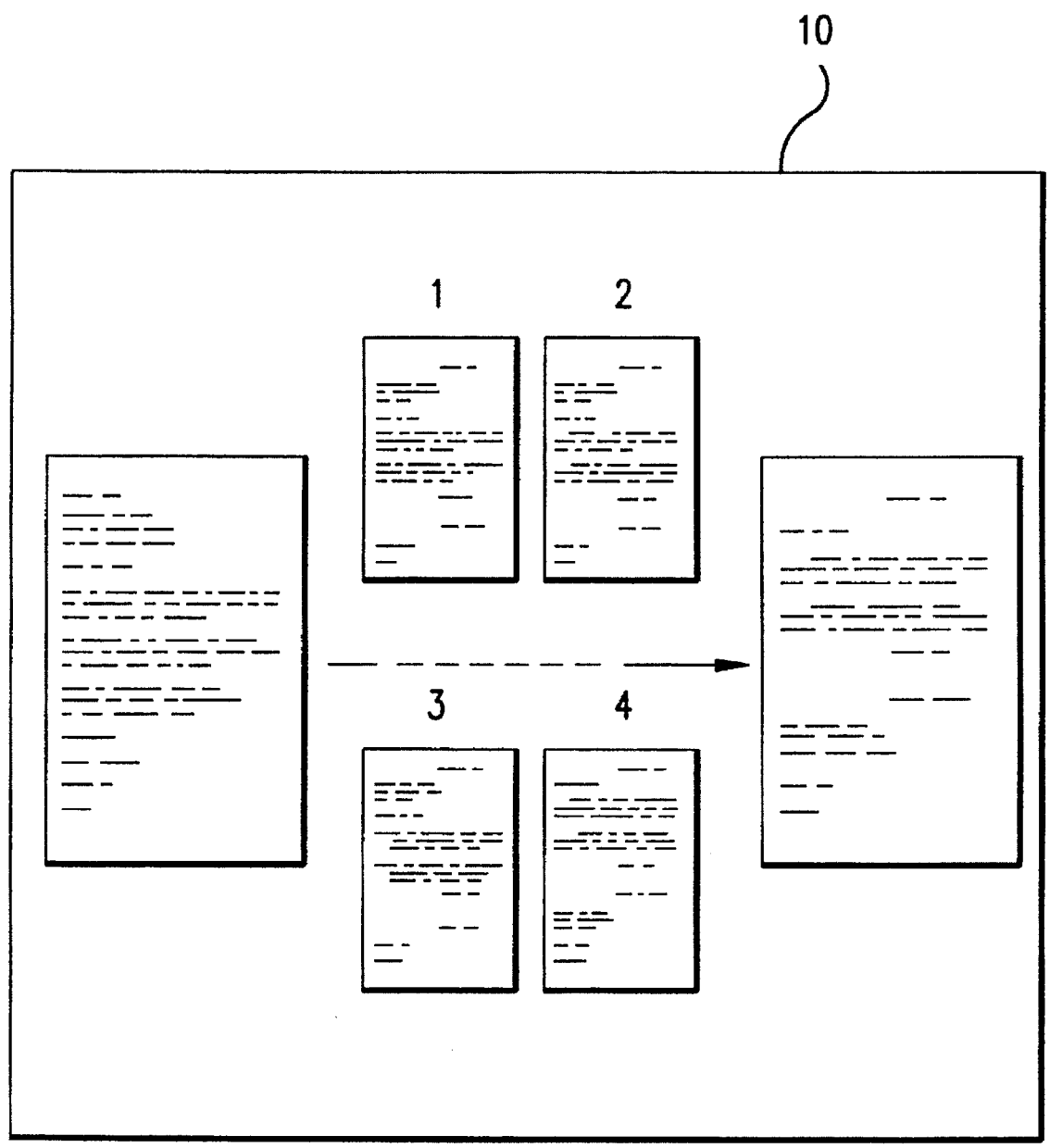
FIG. 17 is a schematic illustration of a layout of the edited letter text displayed on the CRT display.

Next, in S30 in the automatic edit processing control shown in FIG. 4, the layout of the English letter text after being edited and stored in the work memory 22 is displayed in the letter format select image on the CRT display 10. Then, the edit ending flag EF is set (S31), and the program returns to S22. The layout display processing is generally known, and the detailed explanation thereof will therefore be omitted. For example, as shown in FIG. 17, the layout of the edited English letter text is displayed at the right end portion of the letter format select image on the CRT display 10.

If the layout of the edited text thus displayed is satisfactory, the execution key is operated (S22: Yes; S23: No; S24: Yes), and the edited text data stored in the work memory 22 is substituted for the text data stored in the text memory 21 (S34). Then, the automatic edit processing control is ended. The program returns to S11 in the text processing control shown in FIG. 3.

On the other hand, if one of the numeral "1"–"4" keys corresponding to another letter format different from the letter format of the edited text displayed in the letter format select image is operated to change the letter format (S22: Yes; S23, S24: No; S25: Yes), the work memory 22 is cleared (S32) since the edit ending flag EF remains set (S26: Yes). Then, all the letter format flags are reset (S33). The step S27 and the subsequent steps are executed again. Further, if the return key is operated (S22, S23: Yes), the automatic edit processing is ended, and the program returns to S11 in the text processing control shown in FIG. 3.

Figure 13:
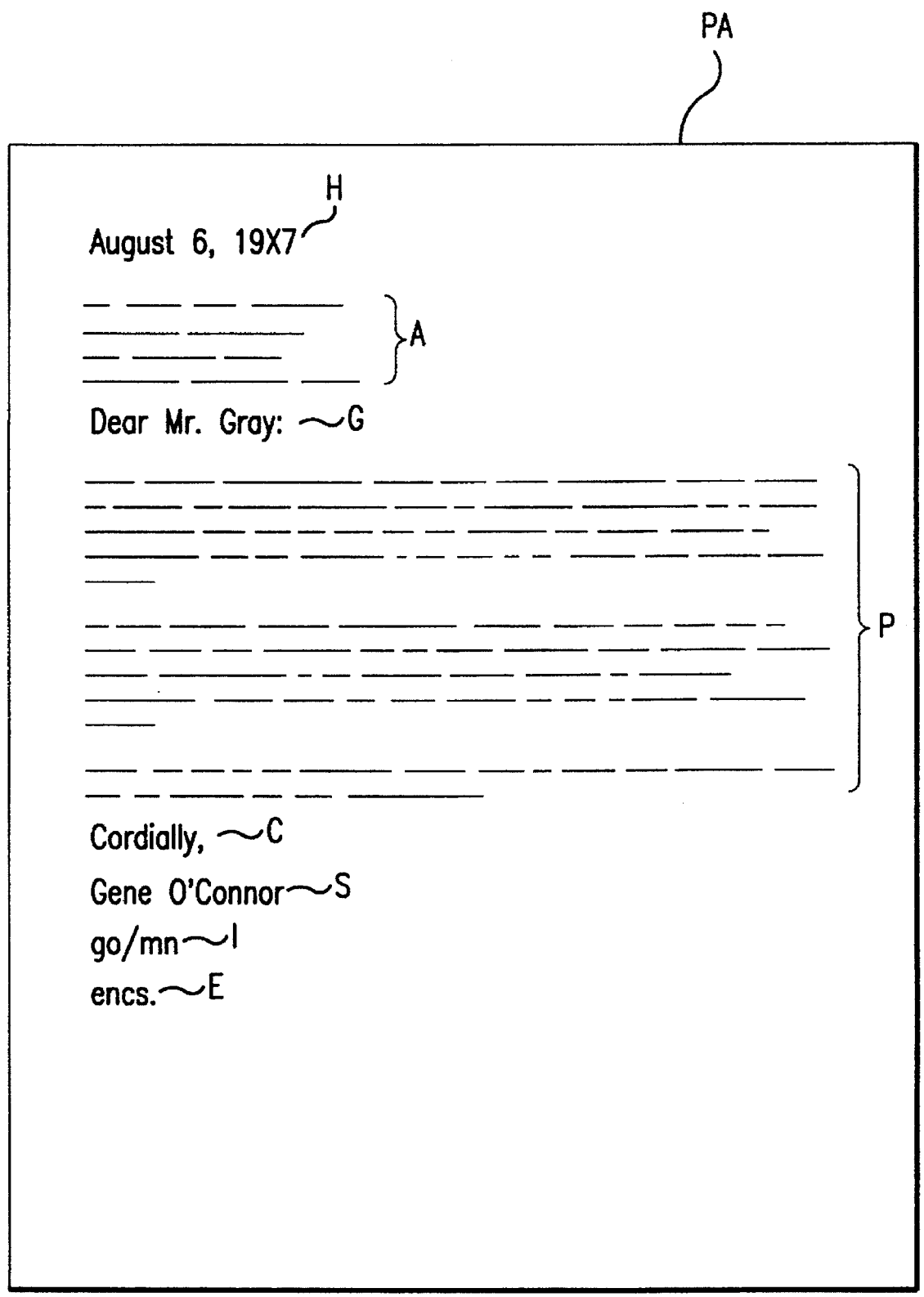
FIG. 13 is a schematic illustration of a print of an English letter text input.

Accordingly, in editing the English letter text to the official style format, for example, the input text in the letter format shown in FIG. 13 is automatically edited to the official style format. The edited text is printed on the print paper PA in the official style format as shown in FIG. 18.

As described above, the English letter text, including the date block H, the address block A, the salutation block G, etc., is input and stored, and a desired English letter format is selected and set through the layout displayed on the CRT display 10. The input English letter text is automatically edited to the selected English letter format. Accordingly, even an operator having no knowledge regarding the English letter formats can easily and accurately create a letter text with a specific desired English letter format.

Further, in printing the English letter, it is unnecessary for the operator to sequentially move a cursor position or a carriage position in a printing direction. Thus, creating of the letter text is more efficient.

In addition, the letter text thus automatically edited is displayed on the CRT display 10. Accordingly, the operator can confirm the selected English letter format through the layout displayed. The operator can also confirm the layout of the letter text automatically edited before printing.

The invention may be modified to use layouts of various other English letter formats such as a full block format. These may be displayed in the letter format select image. Also, edit control programs for automatically editing these letter formats inclusive of the full block format may be preliminarily stored in the ROM 15. Further, a desired one of the plural layouts of different letter formats may be designated by the cursor, and may be selected and set by operating the execution key. Further, in inputting the text data of the English letter, the date data, the address data, etc. may be continuously input without inputting the line feed codes.

While advantageous embodiments have been chosen to illustrate the invention, it will be understood by those skilled in the art that various changes and modifications can be made therein without departing from the scope of the invention as defined in the appended claims.

What is claimed is:

1. A text processing device, comprising:

input means for inputting text data and commands;

data storage means for storing the text data input from said input means;

a plurality of predetermined document formats stored in the data storage means, each of the plurality of predetermined document formats corresponding to a different predetermined arrangement of text sections in a document;

display means for displaying the text data, the display means including a display;

format display control means for displaying a graphical layout of at least one of the plurality of predetermined document formats on said display according to an automatic edit command input from said input means;

format selecting means for selecting and setting one of the at least one of the plurality of predetermined document formats through the graphical layout displayed on said display; and edit control means for automatically editing the text data inputted from said input means and stored in said data storage means to place the text data into the selected one of the plurality of predetermined document formats.

2. The text processing device of claim 1, wherein said format display control means displays at least one of a plurality of alternate English letter formats.

3. The text processing device of claim 2, wherein said data storage means stores the text data in blocks corresponding to at least one of a date, an address, a salutation, a body, a close, a signature, and a plurality of initials.

4. The text processing device of claim 3, wherein said edit control means comprises a data controller that stores at least one address for each block of the text data.

5. The text processing device of claim 4, wherein said edit control means further comprises a format editor that reads the at least one address stored in the data controller and stores the at least one address read by the format editor in said data storage means, the at least one address corresponding to blocks of the text data for the selected format.

6. The text processing device of claim 1, wherein said input means inputs the text data comprising at least one of a date block, an address block, a salutation block, a letter body block, a close block, and a signature block.

7. The text processing device of claim 1, wherein said edit control means comprises a data controller that stores at least one address for the text data, the text data being stored as blocks corresponding to sections of a letter.

8. The text processing device of claim 7, wherein said edit control means further comprises a format editor that reads the at least one address stored in the data controller and stores the at least one address read by the format editor in said data storage means, the at least one address corresponding to blocks of text data for the selected format.

9. The text processing device of claim 1, wherein said edit control means checks a sheet size and adjusts at least one of a top margin, a bottom margin, a side margin, a page length, and a page break for printing.

10. The text processing device of claim 1, wherein said format display control means includes an edit ending indicator and a letter format indicator.

11. The text processing device of claim 1, wherein said edit control means searches the text data for key words and blank lines and stores a location of the key words and blank lines based on the selected format.

12. The text processing device of claim 1, wherein the format display control means simultaneously displays a graphical layout of at least one of the plurality of predetermined document formats on said display.

13. The text processing device of claim 1, further comprising:
   image storing means for storing a plurality of format images corresponding to the plurality of predetermined document formats, wherein the graphical layout of at least one of the plurality of predetermined document formats comprises at least one of the plurality of format images.

14. The text processing device of claim 1, wherein the display simultaneously displays the text data and at least one of the plurality of the predetermined alternate document formats.

15. A text processing device, comprising:
   an input device that inputs text data;
   a memory device that stores the text data;
   a plurality of predetermined document formats stored in the memory device, each of the plurality of predetermined document formats corresponding to a different predetermined arrangement of text sections of a document;
   a display that displays the text data and at least one of the plurality of predetermined document formats;
   a format selector that selects one of the plurality of predetermined document formats from one of the at least one of the plurality of predetermined document formats displayed on the display; and
   an editor that automatically edits the text data based on the selected one of the plurality of predetermined document formats to form formatted text data, and stores the formatted text data in the memory device.

16. The text processing device of claim 15, wherein said memory device stores the text data in blocks and the editor controls the storage of an address for each block.

17. The text processing device of claim 16, wherein said editor reads the the addresses for each block and controls the storage of each address in a work memory corresponding to the selected one of the plurality of predetermined document formats.

18. The text processing device of claim 15, wherein said memory stores a plurality of alternate English letter formats.

19. The text processing device of claim 15, wherein said input device inputs text data comprising at least one of a date block, an address block, a salutation block, a letter body block, a close block, and a signature block.

20. The text processing device of claim 15, wherein said memory stores the text data in blocks corresponding to at least one of a date, an address, a salutation, a body, a close, a signature, and a plurality of initials.

21. The text processing device of claim 15, wherein said editor includes an edit ending indicator and a letter format indicator.

22. The text processing device of claim 15, wherein said editor searches the text data for key words and blank lines and stores a location of the key words and the blank lines based on the selected one of the plurality of predetermined document formats.

23. The text processing device of claim 15, wherein the display simultaneously displays the text data and at least one of the plurality of the alternate document formats.

24. The text processing device of claim 23, wherein the display simultaneously displays the text data and the plurality of the alternate document formats.

25. The text processing device of claim 23, wherein the display further simultaneously displays the formatted text data.

26. The text processing device of claim 15, wherein the memory device further stores a plurality of format images corresponding to the plurality of predetermined document formats, the display displaying at least one of the plurality of format images as the at least one of the plurality of predetermined document formats.

27. A method for automatically formatting text data, comprising:
   providing a plurality of predetermined document formats in a memory device, each of the plurality of predetermined document formats corresponding to a different predetermined arrangement of text sections of a document;
   inputting text data using an input device;
   storing the text data in the memory device;
   simultaneously displaying the text data and at least one format image corresponding to at least one of the plurality of predetermined document formats;
   selecting one of the at least one of the plurality of predetermined document formats from the displayed at least one format image;
   searching the text data for key words and blank spaces;
   marking the text data based on the searching step; and
   storing the marked text data in the memory device in the selected one of the plurality of the predetermined document formats.

* * * * *